United States Patent
Kawatoko et al.

(10) Patent No.: US 7,264,325 B2
(45) Date of Patent: Sep. 4, 2007

(54) PRINTING APPARATUS AND PRINTING METHOD

(75) Inventors: Norihiro Kawatoko, Kanagawa (JP); Jiro Moriyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/500,884

(22) Filed: Aug. 9, 2006

(65) Prior Publication Data

US 2006/0268039 A1    Nov. 30, 2006

Related U.S. Application Data

(62) Division of application No. 10/898,192, filed on Jul. 26, 2004, now Pat. No. 7,152,948.

(30) Foreign Application Priority Data

Jul. 31, 2003    (JP)    ............................. 2003-284384

(51) Int. Cl.
    *B41J 2/205*    (2006.01)
    *G06K 1/00*    (2006.01)
(52) U.S. Cl. ........................................ 347/15; 358/1.9
(58) Field of Classification Search ................. 347/15, 347/43; 358/1.2, 1.9, 3.01, 525, 523, 3.21
    See application file for complete search history.

(56) References Cited

U.S. PATENT DOCUMENTS

| 6,164,745 A  | * | 12/2000 | Nagoshi et al. ............... 347/15 |
| 6,199,968 B1 |   | 3/2001  | Katakura et al. ............... 347/9 |
| 2002/0181000 A1 | * | 12/2002 | Fukasawa et al. ........... 358/1.9 |
| 2003/0016261 A1 | * | 1/2003 | Nitta et al. ..................... 347/15 |

FOREIGN PATENT DOCUMENTS

| JP | 6-139348 | 5/1994 |
| JP | 10-24567 | 1/1998 |

* cited by examiner

*Primary Examiner*—Lamson Nguyen
(74) *Attorney, Agent, or Firm*—Fitzpatrick, Cella, Harper & Scinto

(57) ABSTRACT

The present invention provides a printing apparatus and method which can appropriately thin dots for printing so as to ensure a print grade. When dots of a black ink is subjected to thinned printing, the dots are thinned using output gamma correction that corrects print data so as to reduce the print density of an image. On the other hand, when dot of a color ink other than the black ink is subjected to the thinned printing, the number of dots formed per print pixel is reduced.

7 Claims, 17 Drawing Sheets

BLACK INK

COLOR INK

BLACK INK

COLOR INK

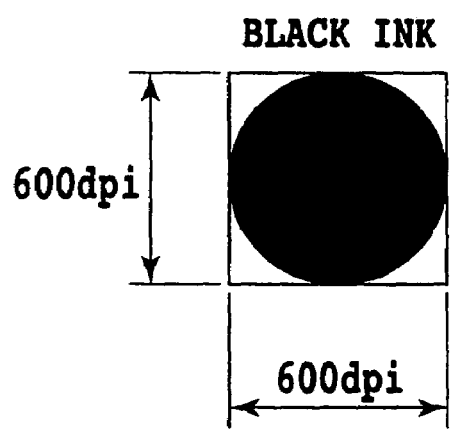 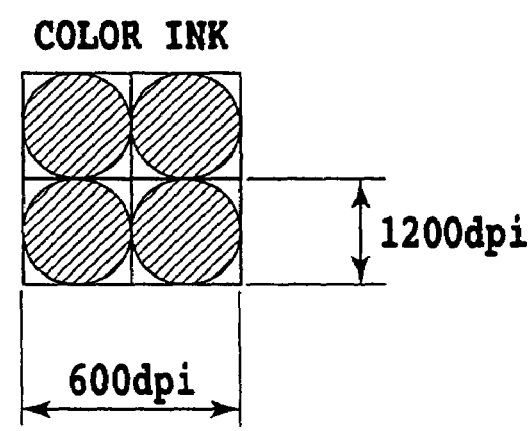
FIG.10A    FIG.10B

BLACK INK

COLOR INK

BLACK INK

COLOR INK

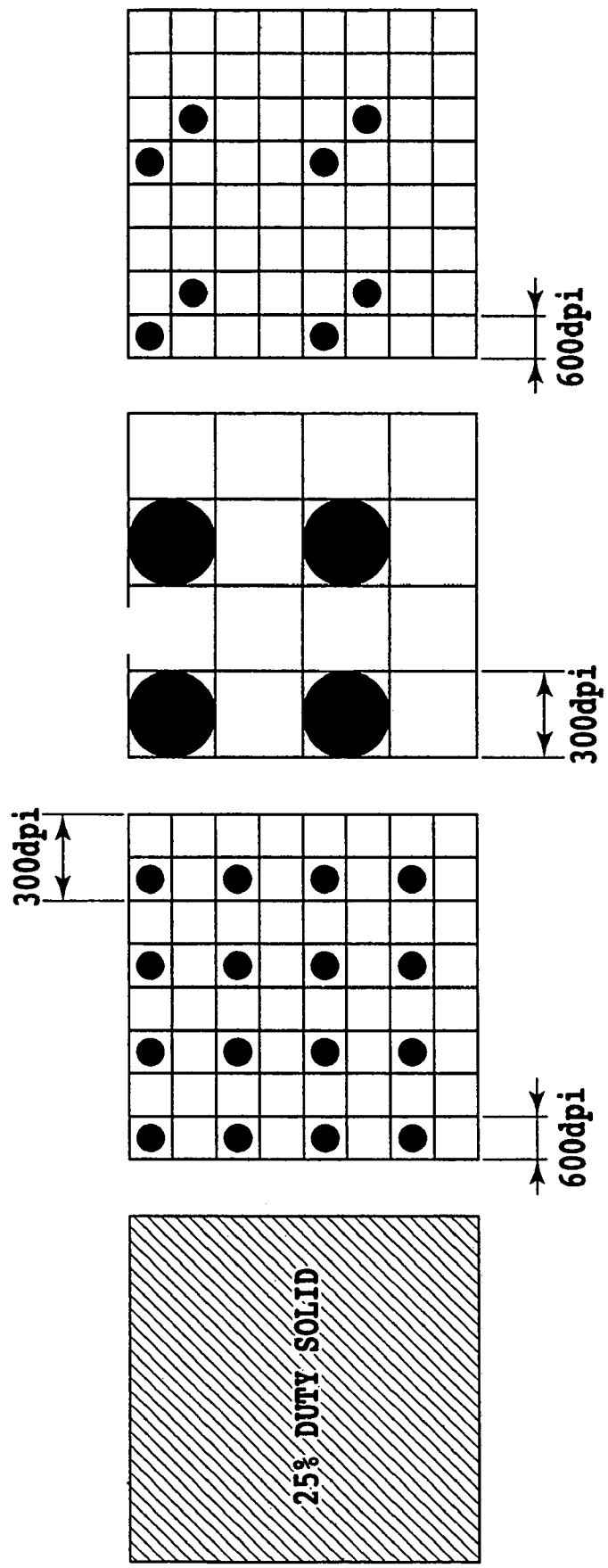

PRINTING APPARATUS AND PRINTING METHOD

This application is a divisional application of application Ser. No. 10/898,192, filed Jul. 26, 2004 now U.S. Pat. No. 7,152,948, which is incorporated herein by reference.

BACKGROUND OF THE INVENTION

1. Field of the Invention

The present invention relates to a printing apparatus and method for printing images by forming ink dots, and more specifically, to a printing apparatus and method for printing letters or images by applying inks on the basis of print data to form ink dots on a printing medium.

2. Description of the Related Art

Some printing apparatuses such as printers, copiers, and facsimile machines print images by forming a dot pattern on a printing medium, for example, paper or a thin plastic film, on the basis of image information. These printing apparatus use various printing systems such as an ink jet type, a wire dot type, a thermal type, and a laser beam type. In recent years, it has been desired to increase the print speed of the printing apparatus, improve the quality of images (resolution) formed by the printing apparatus, and reduce noise from the printing apparatus.

The ink jet type printing apparatus (ink jet printing apparatus) meet these requirements. The ink jet printing apparatus print an image by attaching ink (print liquid) droplets ejected from ejection openings in a print head, to a printing medium. Further, the ink jet printing apparatus can print an image on a printing medium in a non-contact manner. Accordingly, it can stably print images on various printing media. Furthermore, the ink jet printing apparatus enables multiple color inks to be easily ejected from the print head. It is thus utilized to print various types of data ranging from texts (letters) formed using a black ink to colored images formed using multiple color inks. In this case, the top priority is given to the print speed for the printing of texts formed using the black ink and to the granular impression and gradation of images for the printing of colored images formed using the multiple color inks. Thus, some ink jet printing apparatuses print a text by ejecting a relatively large amount of black ink on the basis of binary data (indicating whether or not the ink is to be ejected), while printing a colored image by ejecting relatively small amounts of multiple color inks other than the black ink, such as a cyan, magenta, and yellow inks (hereinafter referred to as "color inks") on the basis of multivalued data.

For such ink jet printing apparatuses, a method has been proposed which uses a print density lower than the other methods in order to reduce ink consumption and improve the print speed.

For example, Japanese Patent Application Laid-open No. 6-139348(1994) proposes such an image processing method. With this method, image data of print resolution 600 dpi (dots/inch) (600 dpi for each print area) is first divided into blocks each composed of four (2×2) print areas. Then, if a print dot is present in any block, the print resolution of the image data is converted into a lower one so that one dot is printed in one print area of print resolution 300 dpi. Japanese Patent Application Laid-open No. 10-024567(1998) proposes a method of expanding each pixel unit of a print signal to bit map data that can be formed by a plurality of dots and thinning the dots so that one pixel contains at least one dot.

It is also contemplated that if normal print data is processed at a relatively high resolution of 600 dpi, the time required for processing may be reduced by using a relatively low resolution of 300 dpi. Moreover, if a bit map is used to convert binary print data of 300 dpi so as to increase the resolution to 600 dpi, the ink consumption may be reduced or the print speed may be increased by performing control such that only two dots are printed in a unit block composed of four (2×2) print areas each of 600 dpi.

However, if printing is executed by thinning print data (thinned printing), it is difficult to increase both the print grade of texts (letters) printed using the black ink and the print grade of colored images printed using the color inks.

For example, as described in Japanese Patent Application Laid-open No. 6-139348(1994), printing can be accomplished without partly missing thin lines of one dot width. However, for printing of images, if one or more dots are present in a unit block composed of four (2×2) print areas each having a print resolution of 600 dpi, the print density may disadvantageously be uniform, thus impairing gradation.

For example, as shown in FIG. 15A, a solid image (50% duty solid image) having a print duty 50% at a print resolution of 600 dpi is assumed. In the solid image, printing is uniform all over the print areas. If this image is printed in association with binary data with a normal resolution of 600 dpi, that is, binary data ("1" or "0") indicating whether or not ink is to be ejected into one print area of 600 dpi, the image is printed so as to have a duty of 50% as shown in FIG. 15B. Thus, 2 dots are formed in four (2×2) print areas each of 600 dpi. If this image is subjected to the image processing described in Japanese Patent Application Laid-open No. 6-139348, one dot is formed in one print area of 300 dpi to provide a solid image of print duty 100% as shown in FIG. 15C.

Now, as shown in FIG. 16A, a solid image (25% duty solid image) having a print duty 25% at a print resolution of 600 dpi is assumed. If this image is printed in association with binary data with the normal resolution of 600 dpi, the print duty will be 25% as shown in FIG. 16B. If this image is subjected to the image processing described in Japanese Patent Application Laid-open No. 6-139348(1994) as in the case of FIG. 15C, one dot is formed in one print area of 300 dpi as shown in FIG. 16C. Consequently, a solid image of print duty 100% is formed. This image cannot be distinguished from the image shown in FIG. 15C. Thus, the image processing described in Japanese Patent Application Laid-open No. 6-139348(1994) may significantly impair the gradation of images.

On the other hand, Japanese Patent Application Laid-open No. 10-024567(1998) is premised on the printing of one pixel using a plurality of dots. Accordingly, this method cannot be implemented if up to one dot is printed in one pixel. Further, if one dot is printed using a plurality of dots, the print speed decreases as described in Japanese Patent Application Laid-open No. 10-024567(1998). Moreover, if one pixel is printed using N (an integer of at least 2) dots, a possible thinning rate is 1/N. Consequently, the resulting print grade is insufficient.

During the thinned printing, in which a certain number of dots are thinned, if the print solution is reduced, the following problems may occur.

For example, as shown in FIG. 17A, a solid image (25% duty solid image) having a print duty of 25% at a print resolution of 600 dpi is assumed. If this image is printed in association with binary data with the normal resolution of 600 dpi, the print duty will be 25% as shown in FIG. 17B. Further, if the image shown in FIG. 17A is printed in association with binary data of 300 dpi, the dots are arranged as shown in FIG. 17C. If the image of 300 dpi, shown in FIG. 17C, is expanded so as to have a higher resolution of 600 dpi, that is, the binary data in a print area of 300 dpi is expanded into four (2×2) print areas of 600 dpi, the image shown in FIG. 17D is obtained when the dots are thinned by 50%. That is, the image shown in FIG. 17D is printed by executing thinning by 50% to form two dots in four (2×2) print areas, instead of four dots otherwise formed in the same print areas.

The image shown in FIG. 17D is obtained by thinning the dots in FIG. 17B by 50%. It is thus possible to reduce the ink consumption and improve the print speed. However, within four (2×2) print areas, two dots are printed close to each other so as to make a pair, thus impairing the uniformity of dot arrangement. If the print resolution and then the number of dots used to form one pixel are reduced in order to execute the thinning, the print grade of images may lower.

Thus, with the conventional printing apparatuses, if the thinned printing is executed to reduce the amount of ink for printing, the image grade may lower. Further, to prevent the degradation of images, it is necessary to use a plurality of dots to print one pixel for the normal printing, while using a reduced number of dots to print one pixel for the thinned printing. In this case, the normal print speed may decrease.

SUMMARY OF THE INVENTION

It is an object of the present invention to provide a printing apparatus and method which can appropriately thinning dots for printing so as to ensure a print grade.

In the first aspect of the present invention, there is provided a printing apparatus that can print an image by using a black ink and a color ink other than the black ink to form dots of the black ink and color ink on a printing medium on the basis of print data, the apparatus comprising:

thinned printing control means for the black ink for carrying out printing by thinning dots of the black ink to be formed on the basis of the print data; and thinned printing control means for the color ink for carrying out printing by thinning dots of the color ink to be formed on the basis of the print data, wherein the thinned printing control means for the black ink and the thinned printing control means for the color ink have different dot thinning systems.

In the second aspect of the present invention, there is provided a printing apparatus that prints an image by forming one ink dot and a plurality of ink dots per print pixel on a printing medium on the basis of print data, the apparatus comprising:

first and second thinned printing control means for carrying out printing by thinning dots to be formed on the basis of the print data, wherein if one dot is formed per print pixel, the first thinned printing control means thins dots using output gamma correction that corrects the print data so as to reduce a print density of the image, and if a plurality of dots are formed per print pixel, the second thinned printing control means reduces the number of dots formed per print pixel.

In the third aspect of the present invention, there is provided a printing apparatus that prints an image by forming one ink dot and a plurality of ink dots per print pixel on a printing medium on the basis of print data, the apparatus comprising:

first and second thinned printing control means for carrying out printing by thinning dots to be formed on the basis of the print data, wherein if one dot is formed per print pixel, the first thinned printing control means thins dots using output gamma correction that corrects the print data so as to reduce a print density of the image, and if a plurality of dots are formed per print pixel, the second thinned printing control means forms dots in accordance with a dot pattern that reduces the number of dots formed.

In the fourth aspect of the present invention, there is provided a printing method that can print an image by using a black ink and color ink other than the black ink to form dots of the black ink and color ink on a printing medium on the basis of print data, the method comprising:

a thinned printing step of carrying out printing by thinning dots of the black ink and color ink to be formed on the basis of the print data, wherein in the thinned printing step, a dot thinning system for the black ink is different from a dot thinning system for the color ink.

In the fifth aspect of the present invention, there is provided a printing method of printing an image by forming one ink dot and a plurality of ink dots per print pixel on a printing medium on the basis of print data, the method comprising:

a thinned printing step of carrying out printing by thinning dots to be formed on the basis of the print data, wherein if one dot is formed per print pixel, then in the thinned printing step, dots are thinned using output gamma correction that corrects the print data so as to reduce a print density of the image, and if a plurality of dots are formed per print pixel, then in the thinning printing step, the number of dots formed per print pixel are reduced.

In the sixth aspect of the present invention, there is provided a printing method of printing an image by forming one ink dot and a plurality of ink dots per print pixel on a printing medium on the basis of print data, the method comprising:

a thinned printing step of carrying out printing by thinning dots to be formed on the basis of the print data, wherein if one dot is formed per print pixel, then in the thinned printing step, dots are thinned using output gamma correction that corrects the print data so as to reduce a print density of the image, and if a plurality of dots are formed per print pixel, then in the thinned printing step, dots are formed in accordance with a dot pattern that reduces the number of dots formed.

According to the present invention, the print grade can be ensured by appropriately thinning dots in accordance with the type of the ink and the number of dots formed per print pixel. Specifically, it is possible to employ a thinning system adapted for print images such as texts (letters) formed using the black ink and a thinning system adapted for colored print images formed using the color inks. Alternatively, it is possible to employ a thinning system that operates depending on whether one dot or a plurality of dots are formed per print pixel. Consequently, thinned printing can be realized which minimizes the degradation of the image quality.

The above and other objects, effects, features and advantages of the present invention will become more apparent from the following description of embodiments thereof taken in conjunction with the accompanying drawings.

BRIEF DESCRIPTION OF THE DRAWINGS

FIGS. 10A and 10B are diagrams illustrating a black ink dot and color ink dots in normal printing according to a second embodiment of the present invention;

FIGS. 17A, 17B, 17C, and 17D are diagrams illustrating another conventional example in which an image of print duty 25% is thinned.

DETAILED DESCRIPTION OF PREFERRED EMBODIMENTS

Embodiments of the present invention will be described below with reference to the drawings. The embodiments below are examples in which the present invention is applied to an ink jet printing apparatus.

First, before describing the embodiments of the present invention, an example of the basic configuration of an ink jet printing apparatus to which the present invention is applicable will be described with reference to FIGS. 1 to 3.

(Example of Basic Configuration of Ink Jet Printing Apparatus)

Figure 1:
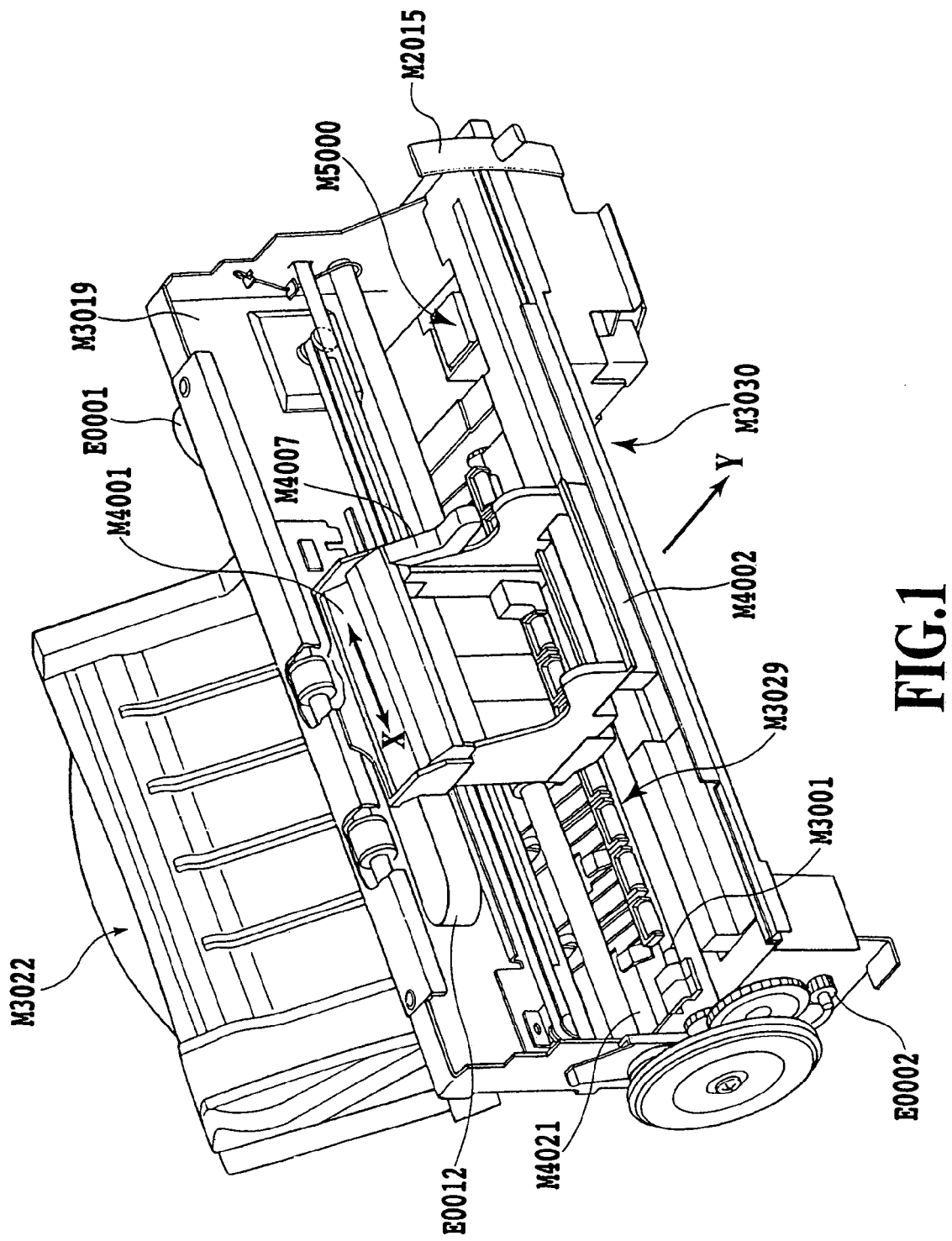
FIG. 1 is a perspective view of essential parts of an ink jet printing apparatus to which the present invention is applicable.
Figure 2:
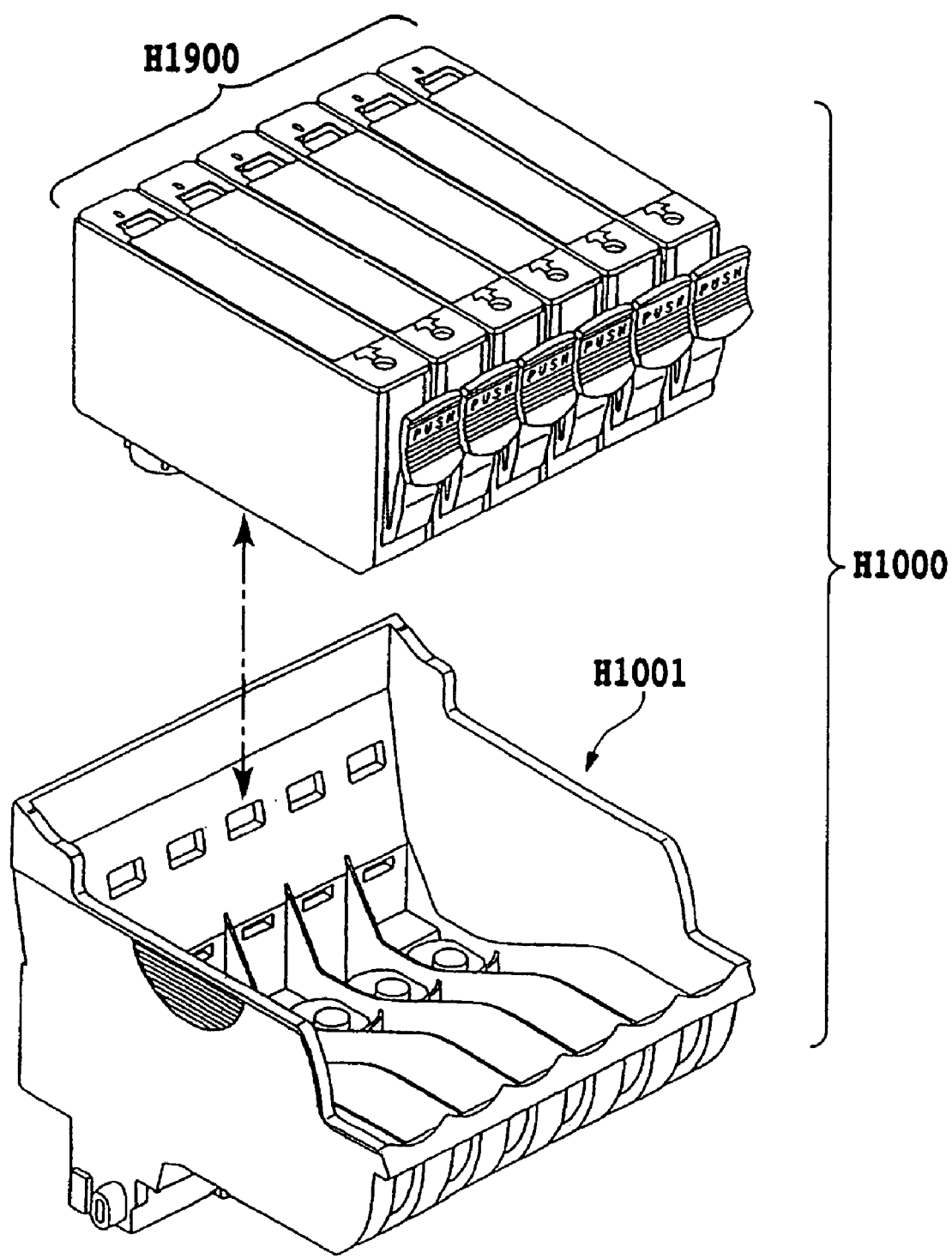
FIG. 2 is a perspective view of a print head used in the printing apparatus in FIG. 1.

FIGS. 1 and 2 are schematic diagrams of essential parts of an ink jet printing apparatuses to which the present invention is applicable.

In FIG. 1, a chassis M3019 housed in a sheath member of the printing apparatus is composed of a plurality of plate-like metal members having a predetermined rigidity, to constitute a framework of the printing apparatus. The chassis M3019 holds printing operation mechanisms described below. An automatic feeding section M3022 automatically feeds paper (printing medium) to the interior of the apparatus main body. A conveying section M3029 guides the paper fed from the automatic feeding section M3022 sheet by sheet, to a predetermined print position. The conveying section M3029 further guides the paper to a discharge section M3030. An arrow Y denotes the direction in which the paper is conveyed (sub-scanning direction). A printing section subjects the paper conveyed to the print position to desired printing. A recovery section M5000 executes a recovery process on the printing section. Reference numeral M2015 denotes an adjusting lever for adjusting a distance (paper distance) between the paper and printing section. Reference numeral M3006 denotes a bearing of an LF roller M3001.

In the printing section, a carriage M4001 is supported by a carriage shaft M4021 so as to be movable in a main scanning direction shown by an arrow X. An ink jet print head H1001 (see FIG. 2) that can eject ink is removably installed in the carriage M4001. The print head H1001 in the present example constitutes a print head cartridge H1000, together with an ink tank H1900 that reserves inks. The ink tank H1900 includes independent ink tanks for, for example, a black, light cyan, light magenta, cyan, magenta, and yellow inks, in order to enable images to be printed so as to have a quality comparable to that of photographs. Each of the ink tanks H1900 is removable from the print head H1001.

The print head H1001 may utilize thermal energy generated by an electrothermal converter, as energy used to eject the inks. In this case, heat generated by the electrothermal converter can be used to cause film boiling so that the resultant bubbling energy can be used to eject the inks through ink ejection openings.

The recovery section M5000 is provided with a cap (not shown) that caps a surface of the print head H1001 in which ink ejection openings are formed. A suction pump may be connected to the cap so as to apply a negative pressure to the inside of the cap. In this case, a negative pressure is applied to the inside of the cap covering the ink ejection openings in the print head H1001, to suck and discharge the inks through the ink ejection openings. Such a recovery process (hereinafter also referred to as a "suction recovery process") can thus be accomplished in order to allow the print head H1001 to maintain favorable ink ejections. Further, an ink not contributing to printing of any images is ejected to the inside of the cap through the ink ejection openings. Such a recovery process (hereinafter also referred to as an "ejection recovery process") can thus be accomplished in order to maintain favorable ink ejections.

As shown in FIG. 1, the carriage M4001 is provided with a carriage cover M4002 to guide the print head H1001 to a predetermined installation position on the carriage M4001. Moreover, the carriage M4001 is provided with a head set lever M4007 engaged with a tank holder of the print head H1001 to set the print head H1001 at the predetermined installation position. The head set lever M4007 is provided so as to be rotatably movable relative to a head set lever shaft located at the top of the carriage M4001. A spring-loaded head set plate (not shown) is included in an engaging portion of the head set lever M4007 which engages with the print head H1001. The head set lever M4007 uses the force of the spring to install the print head H1001 to the carriage M4001 while pressing the print head H1001.

Figure 3:
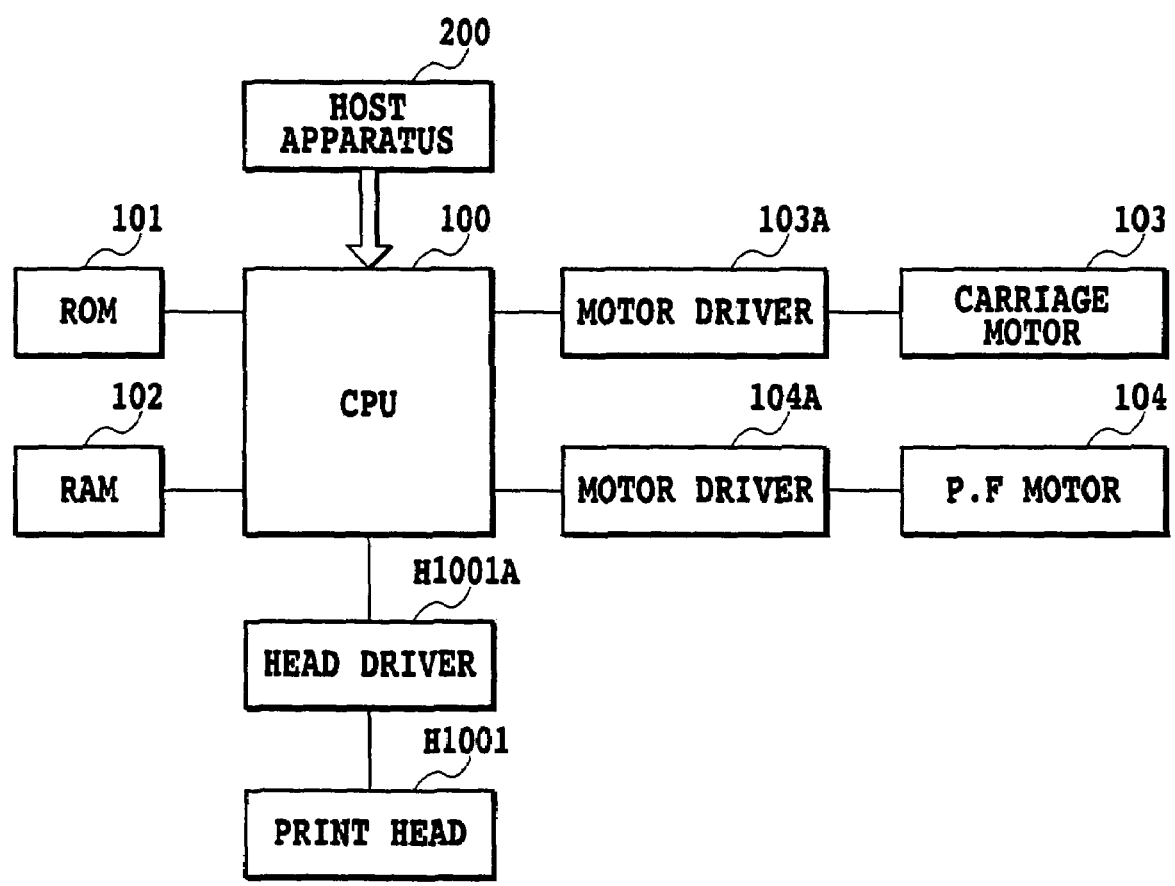
FIG. 3 is a block diagram of a control system in the printing apparatus in FIG. 1.

FIG. 3 is a schematic block diagram of a control system in such a printing apparatus.

In FIG. 3, a CPU 100 executes processes of controlling operations of the printing apparatus in the present example as well as data processing and the like. A ROM 101 stores programs for the procedures of these processes and the like. A RAM 102 is used as a work area in which the processes are executed. The inks are ejected from the print head H1001 by the CPU 100 by supplying a head driver H1001A with drive data (print data) for the electrothermal converter and drive control signals (heat pulse signals). The CPU 100 allows a motor driver 203A to control a carriage motor 203 used to drive the carriage M0001 in the main scanning direction. The CPU 100 also allows a motor driver 104A to control a P.F motor 104 used to convey paper in the sub-scanning direction.

If the ink jet printing apparatus configured as described above is used to execute printing, print data dispatched by a host apparatus 200 (see FIG. 3) through an external I/F is temporarily stored in a print buffer. Then, an image is sequentially printed on paper by alternately repeating a printing operation of ejecting the inks from the print head H1001 on the basis of print data while using the carriage motor 103 to move the print head H1001 in the main scanning direction together with the carriage M4001, and a conveying operation of using the P.F motor to convey the paper in the sub-scanning direction by a predetermined amount.

First Embodiment

FIGS. 4A to 9B are diagrams illustrating a first embodiment of the present invention that can be adapted for the above described ink jet printing apparatus.

Figure 4A:
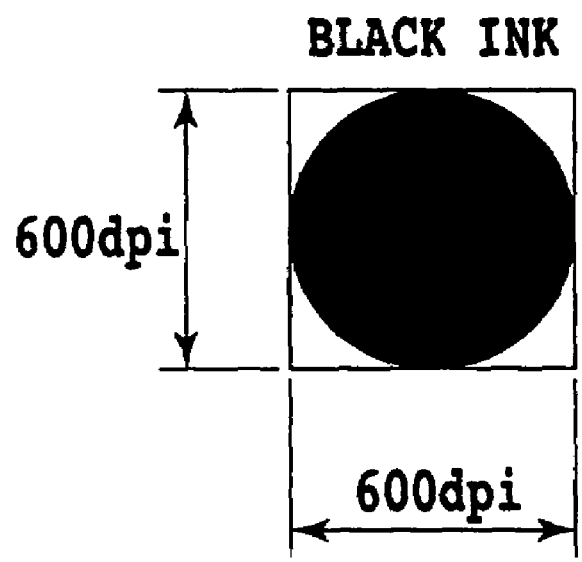
FIGS. 4A and 4B are diagrams illustrating a black ink dot and color ink dots in normal printing according to a first embodiment of the present invention.
Figure 4B:
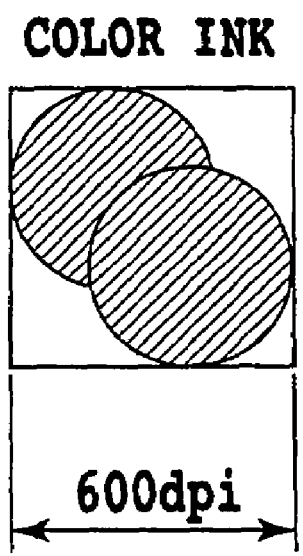
Figure 5A:
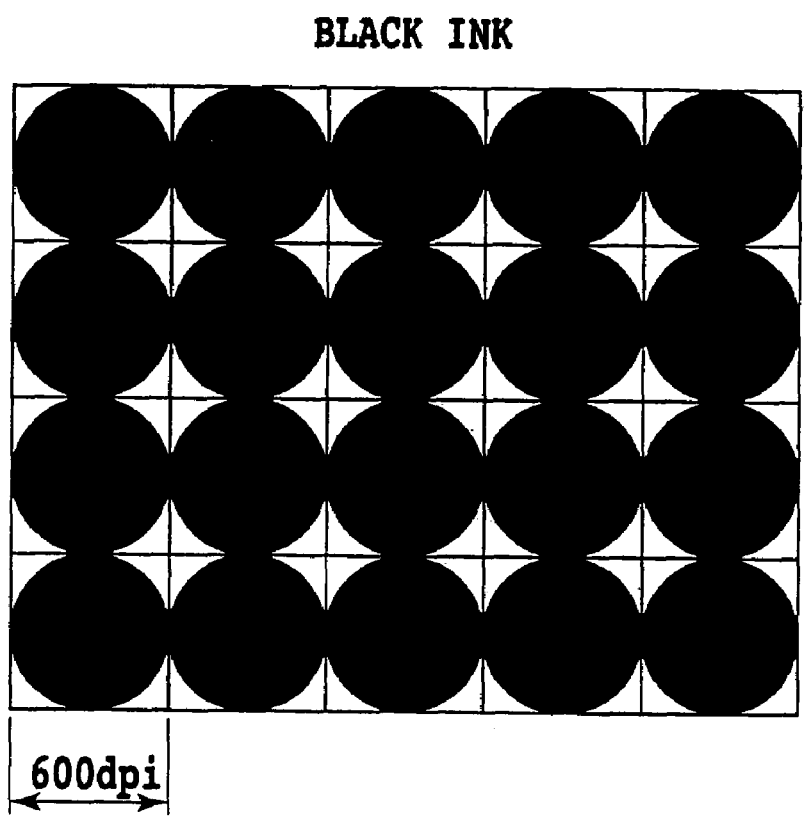
FIGS. 5A and 5B are diagrams illustrating the arrangements of back ink dots and color ink dots, respectively, in the normal printing according to the first embodiment of the present invention.
Figure 5B:
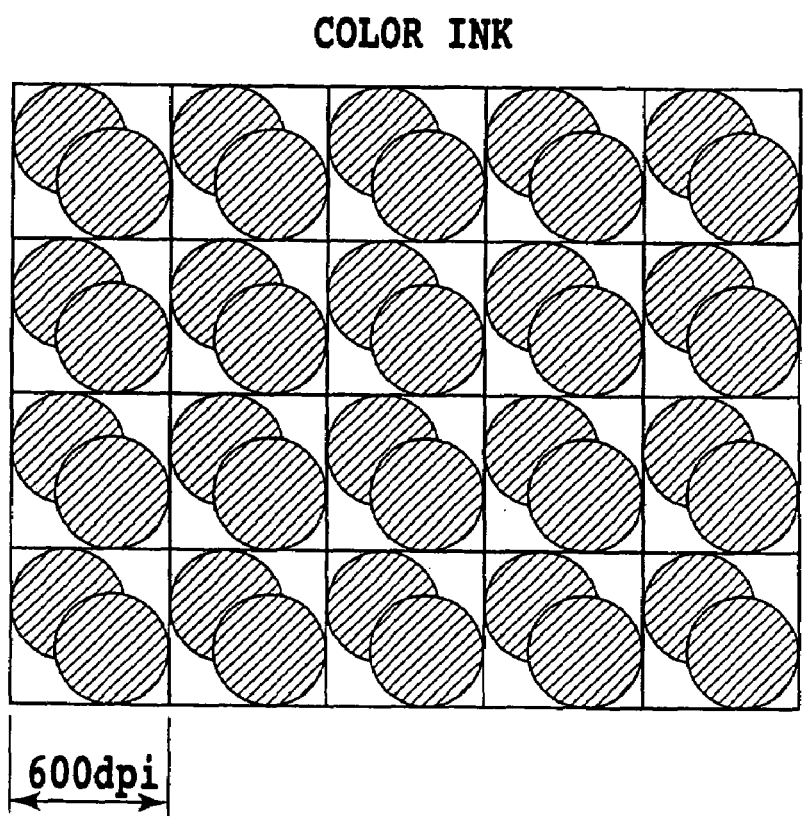

FIGS. 4A, 4B, 5A, and 5B are diagrams illustrating dots formed during normal printing. In the present embodiment, for the black ink, since the print speed for images such as texts (letters) formed using this ink is of greater concern, the amount of ink ejected is set at 30 pl (pico liter) in order to increase a dot diameter as shown in FIG. 4A. When the print duty is uniformly 100%, one dot is formed in a primitive lattice (one print area) of print resolution 600 dpi to print a solid image (100% duty solid image) of the black ink as shown in FIG. 5A. On the other hand, for the inks (hereinafter referred to as the "color inks") other than the black ink, since the gradation and granular impression of print images formed using these inks are of greater concern, the amount of ink ejected is set at 5 pl in order to reduce the dot diameter as shown in FIG. 4B. When the print duty is uniformly 100%, two dots are formed in a primitive lattice of print resolution 600 dpi so as to overlap each other, thus printing a solid image (100% duty solid image) of the color inks as shown in FIG. 5B. In FIG. 4B, the two dots of the color ink are misaligned from each other in the primitive lattice. However, these dots have only to overlap each other within the primitive lattice.

If the print duty is less than 100%, printing is executed using an output signal value obtained by correcting an input signal value for print data. This correction is called output gamma correction and makes the print density of an image proportional to the input signal value. Reference character A in FIG. 6 denotes an output gamma correction value for normal printing in the present example. Actually, in view of the bleeding of ink dots on paper, the output gamma correction value is set on a curve projecting downward in FIG. 6. For simplification, in this example, the output gamma correction curve is assumed to be linear. An output signal subjected to output gamma correction undergoes a quantizing process such as dithering or error diffusion. Then, on the basis of the processed data, the inks are ejected to print an image.

Figure 7:
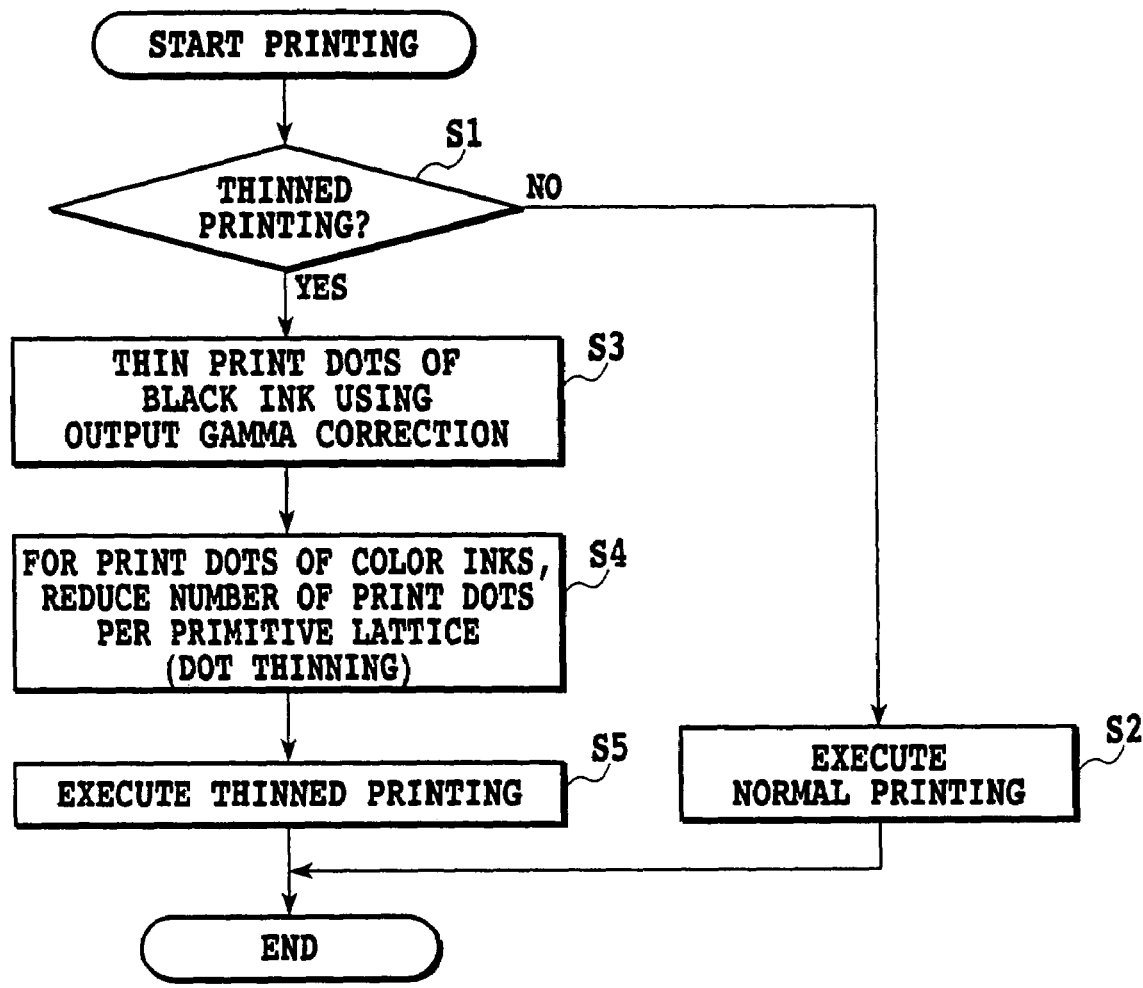
FIG. 7 is a flow chart illustrating a printing operation according to the first embodiment of the present invention.

FIG. 7 is a flow chart illustrating a printing operation.

An instruction is given to the printing apparatus to start printing. Then, on the basis of the type of printing medium, the level of the print grade, the type of the print image, and the amounts of inks remaining, it is determined whether or not to execute thinned printing (step S1). If the thinned printing is not executed, normal printing is executed in which no dots are thinned.

Figure 8A:
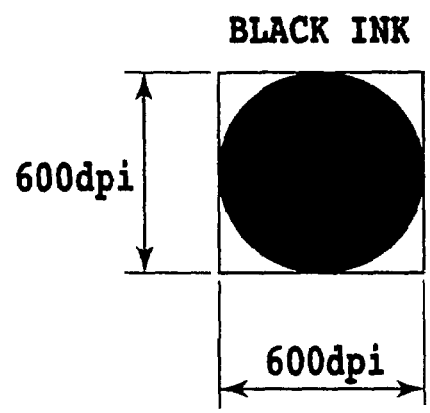
FIGS. 8A and 8B are diagrams illustrating a black ink dot in thinned printing according to the first embodiment of the present invention.
Figure 8B:
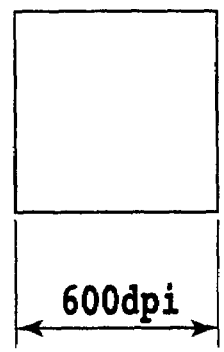
Figure 8C:
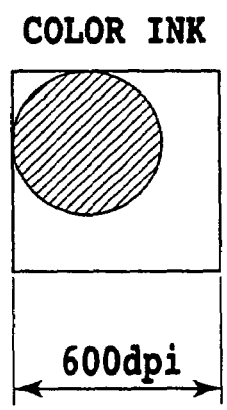
FIG. 8C is a diagram illustrating color ink dots in the thinned printing according to the first embodiment of the present invention.

If the thinned printing is executed, then for dots to be printed using the black ink, output gamma correction is executed to reduce the print density to thin the dots to be printed (step S3). Reference character B1 in FIG. 6 denotes an example of an output gamma correction value required to thin the dots by 50%. For dots to be printed using the color inks, thinning by 50% is executed by printing one dot in the primitive lattice as shown in FIG. 8C instead of two dots otherwise formed in the primitive lattice as shown in FIG. 4B (step S4). After these thinning processes for the black and color inks, thinned printing is executed (step S5).

Figure 6:
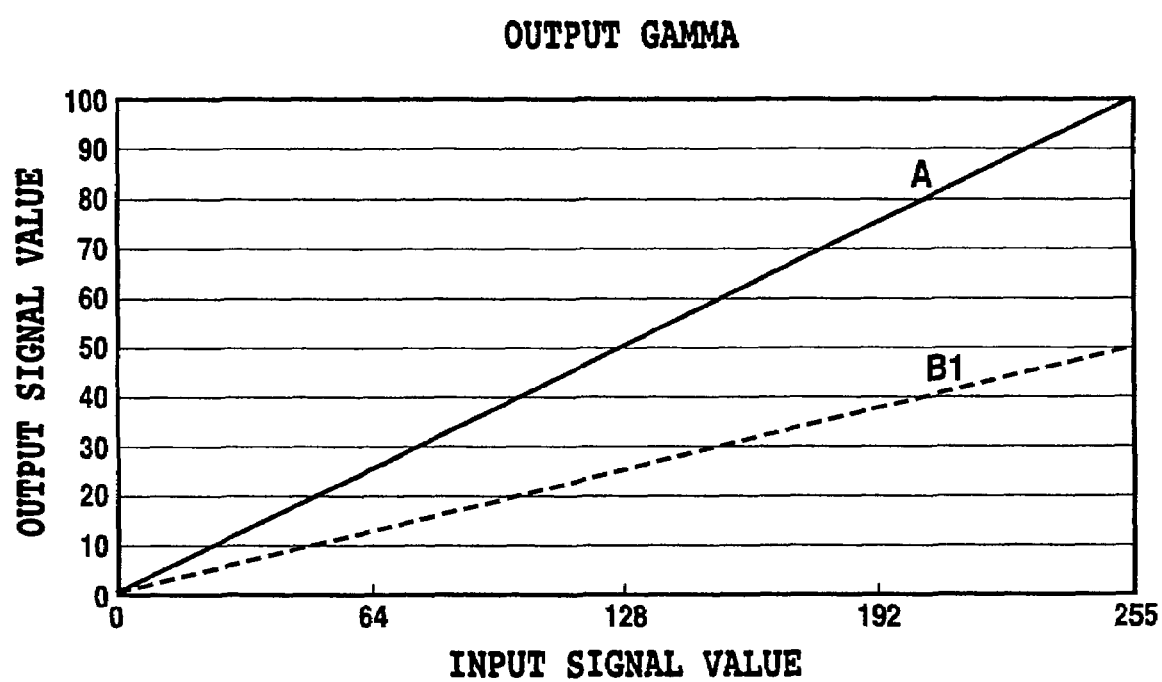
FIG. 6 is a graph illustrating output gamma correction used according to the first embodiment of the present invention.
Figure 9A:
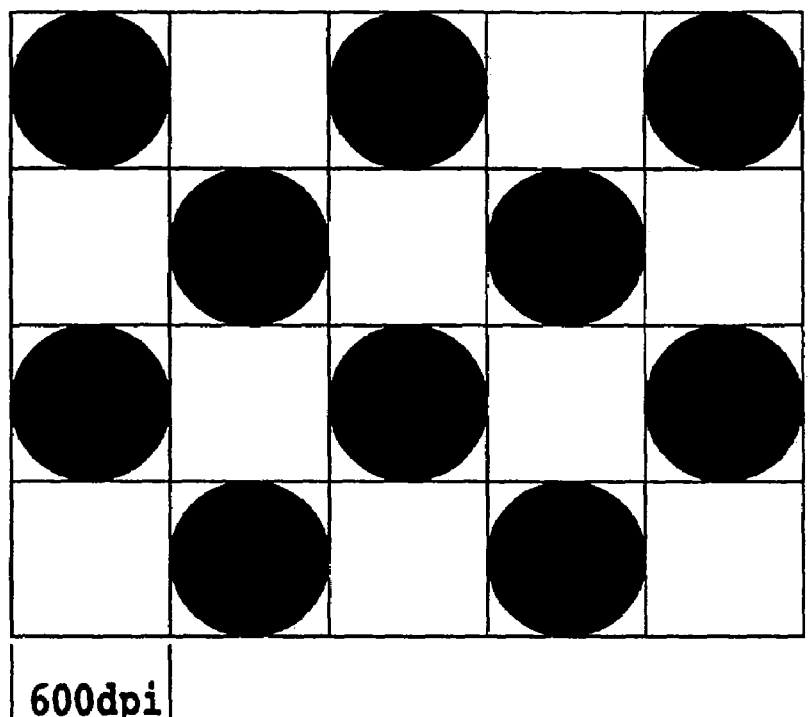
FIGS. 9A and 9B are diagrams illustrating the arrangements of back ink dots and color ink dots, respectively, in the thinned printing according to the first embodiment of the present invention.
Figure 9B:
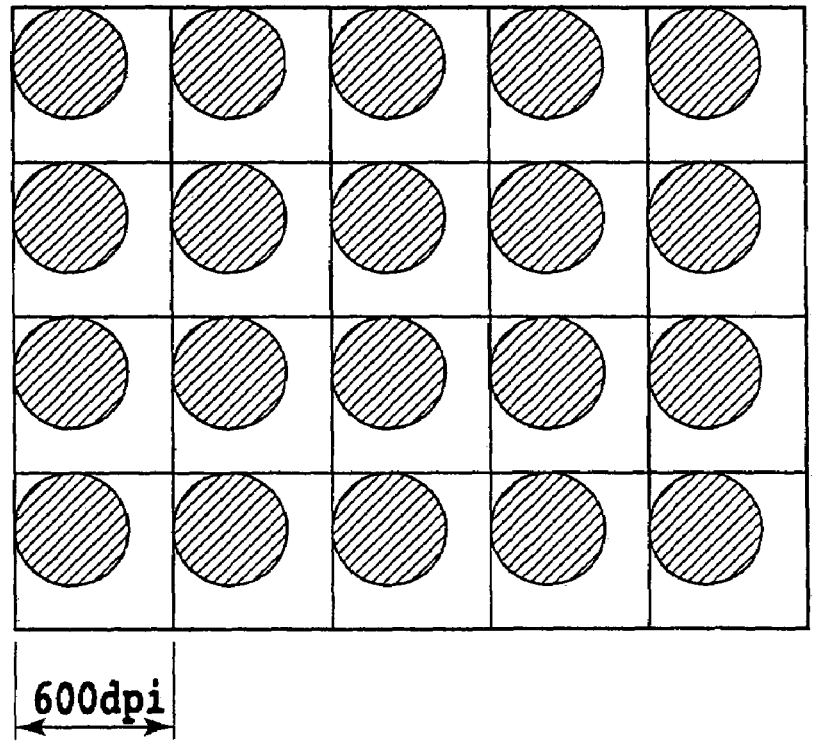

The output gamma correction value B1 in FIG. 6 allows a 100%-print-duty solid image of the black ink such as the one shown in FIG. 5A to be printed so that the print dots are thinned by 50% as shown in FIG. 9A. In this case, as shown in FIG. 8A or 8B, one dot or zero dot (no dot) of the black ink is printed in the primitive lattice. On the other hand, a 100%-print-duty solid image of the color ink such as the one shown in FIG. 5B is printed so that the print dots are thinned by 50% as shown in FIG. 9B.

Thus, the thinning process based on the output gamma correction enables the print dots of the black ink to undergo the thinned printing even if only one dot is printed in the primitive lattice. For the print dots of the color inks, at least one dot is printed in the primitive lattice even if the thinned printing is executed. This suppresses the degradation of images.

The present embodiment comprises two thinning means for executing the thinning process using the output gamma correction and the dot thinning process of reducing the number of dots printed in the primitive lattice. Black ink dots are subjected to the thinned printing using the former thinning means. Color ink dots are subjected to the thinned printing using the latter thinning means. As a result, it is possible to execute the thinned printing on print dots of the black ink, for which only one dot is printed in one print pixel (primitive lattice). Further, print dots of the color inks can be subjected to the thinned printing that minimizes the degradation of colored images.

Second Embodiment

FIGS. 10A to 14B are diagrams illustrating a second embodiment of the present invention that can be adapted for the above described ink jet printing apparatus.

Figure 11A:
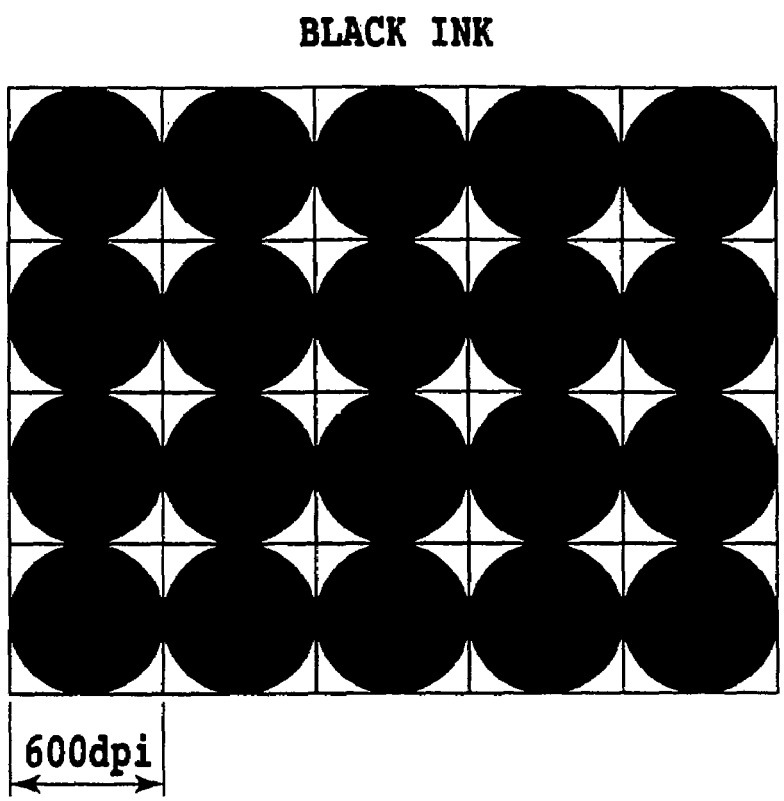
FIGS. 11A and 11B are diagrams illustrating the arrangements of back ink dots and color ink dots, respectively, in the normal printing according to the second embodiment of the present invention.
Figure 11B:
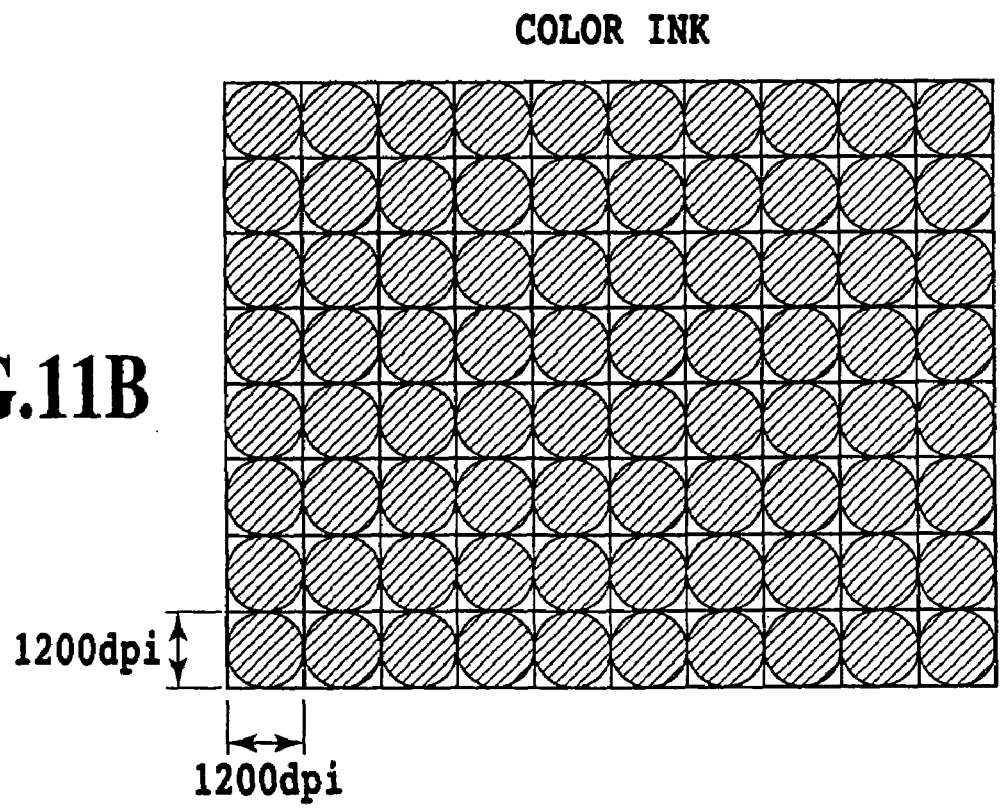

FIGS. 10A and 10B are diagrams illustrating dots formed during normal printing. In the present embodiment, for the black ink, since the print speed for images formed using this ink is of greater concern, the amount of ink ejected is set at 30 pl in order to increase a dot diameter as shown in FIG. 10A. When the print duty is uniformly 100%, one dot is formed in a primitive lattice of print resolution 600 dpi to print a solid image (100% duty solid image) of the black ink as shown in FIG. 11A. On the other hand, for the color inks, since the gradation and granular impression of print images formed using these inks are of greater concern, a high resolution is used for printing. Specifically, as shown in FIG. 10B, image data of 600 dpi is expanded into a dot pattern composed of four (2×2) print areas each of 1,200 dpi. Further, the amount of ink ejected is set at 5 pl in order to reduce the color ink dot diameter. When the print duty is uniformly 100%, one dot is formed in a primitive lattice (print area) of 1,200 dpi to print a solid image (100% duty solid image) of the color inks as shown in FIG. 11B.

Figure 12:
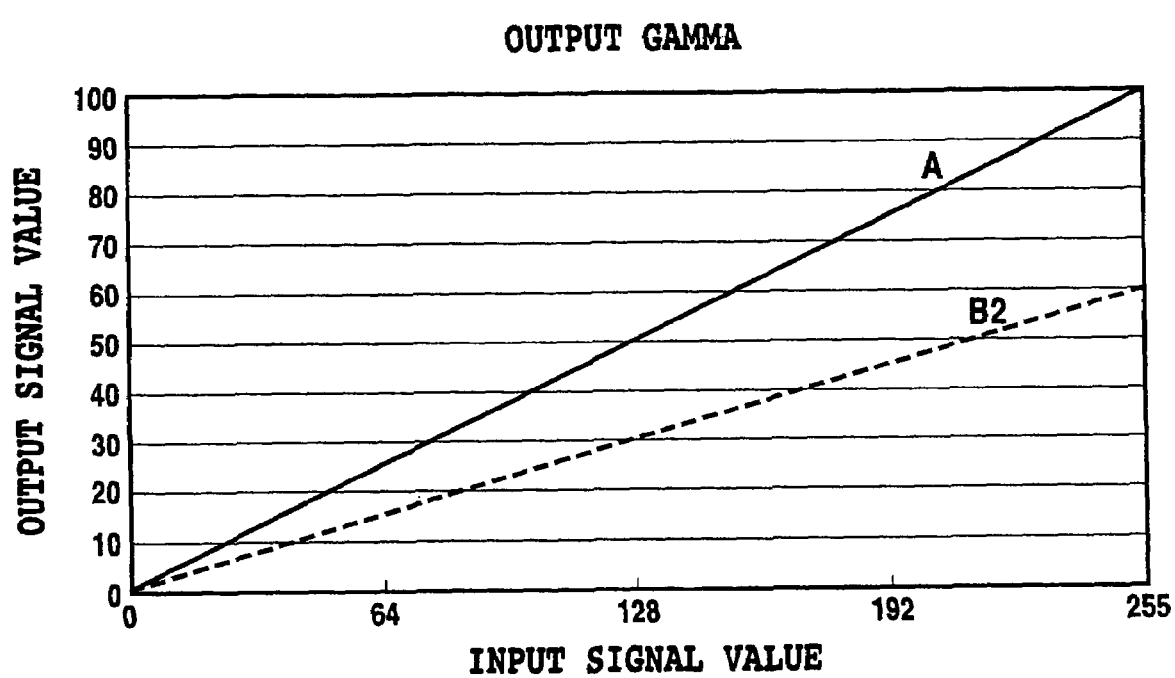
FIG. 12 is a graph illustrating output gamma correction used according to the second embodiment of the present invention.
Figure 13A:
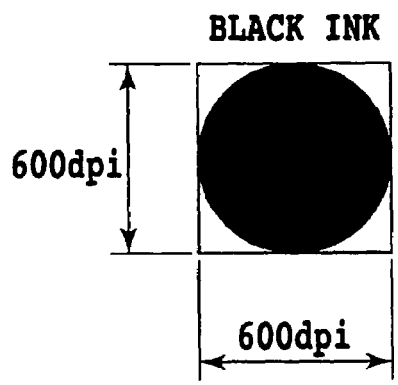
FIGS. 13A and 13B are diagrams illustrating a black ink dot in thinned printing according to the second embodiment of the present invention.
Figure 13B:
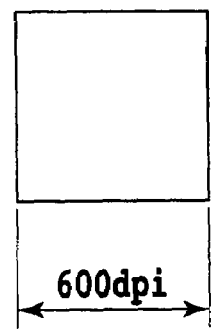
Figure 13C:
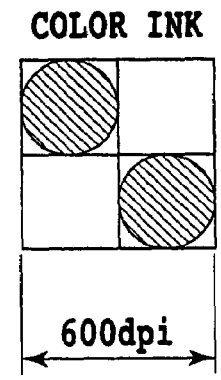
FIG. 13C is a diagram illustrating color ink dots in the thinned printing according to the second embodiment of the present invention.

Reference character A in FIG. 12 denotes an output gamma correction value for the normal printing in the present example. In the present example, for black ink dots, an output gamma correction value B2 corresponding to 60% of the correction value A in FIG. 12 is used to set a thinning rate of 40% and a print duty of 60%. For color ink dots, when image data of 600 dpi is expanded into a dot pattern composed of four (2×2) print areas each of 1,200 dpi, the dots to be formed are thinned. Specifically, printing of print duty 50% is executed using a pattern (index pattern) in which two color ink dots are formed in four (2×2) print areas each of 1,200 dpi as shown in FIG. 13C, instead of four color ink dots otherwise formed in the four print areas.

Figure 14A:
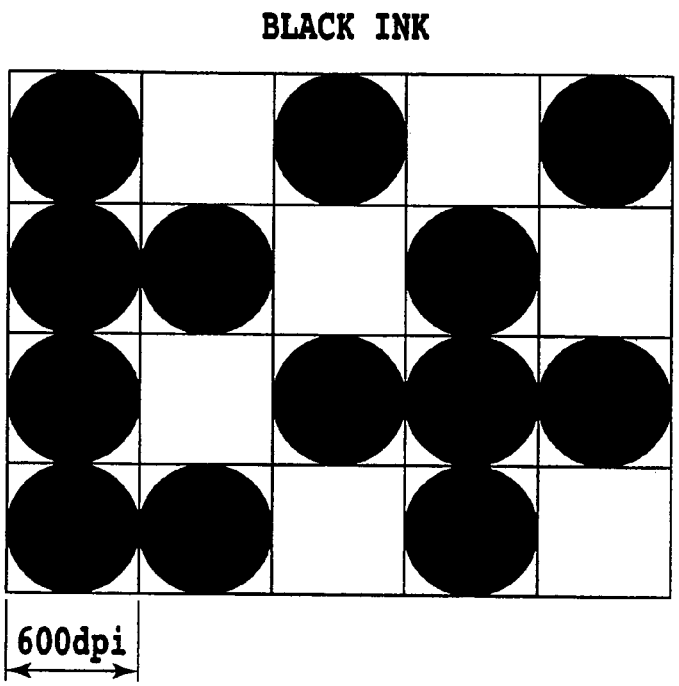
FIGS. 14A and 14B are diagrams illustrating the arrangements of back ink dots and color ink dots, respectively, in the thinned printing according to the second embodiment of the present invention.
Figure 14B:
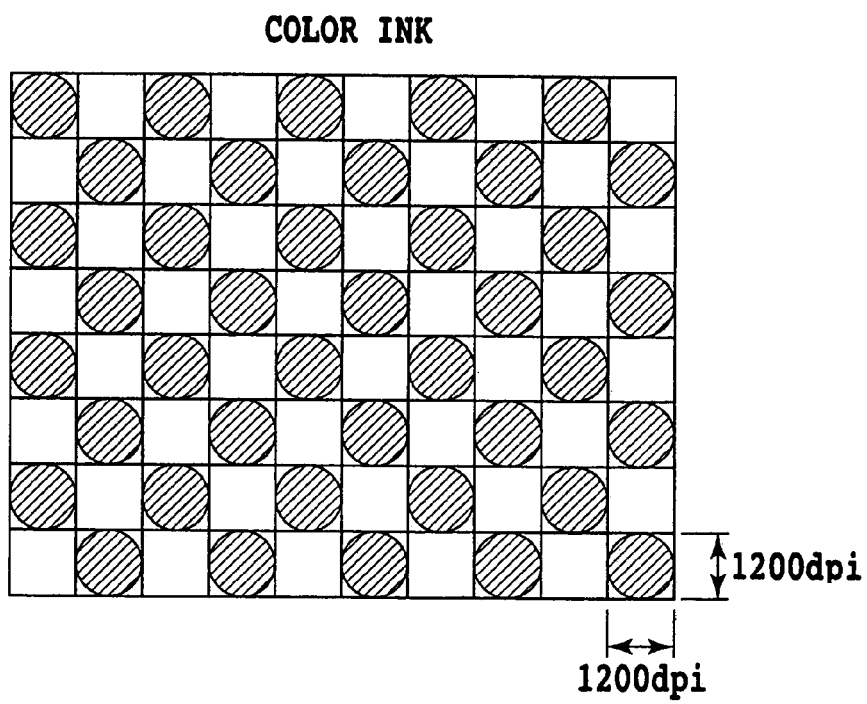
Figure 15C:
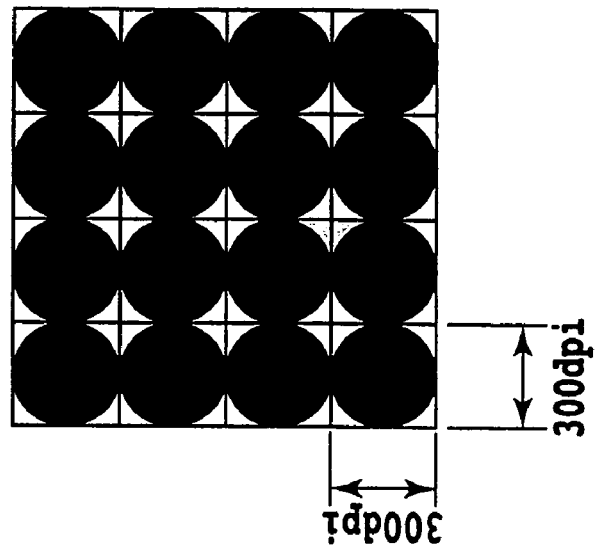
FIGS. 15A, 15B, and 15C are diagrams illustrating a conventional example in which an image of print duty 50% is thinned.
Figure 15B:
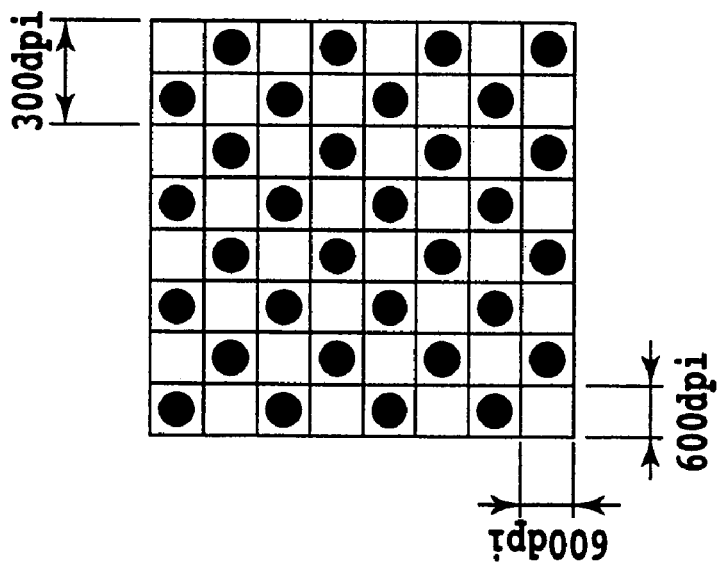
Figure 15A:
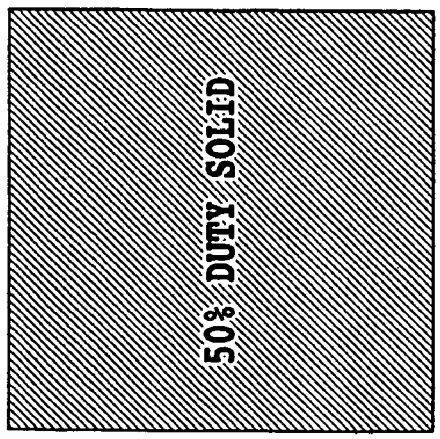
Figure 16C:
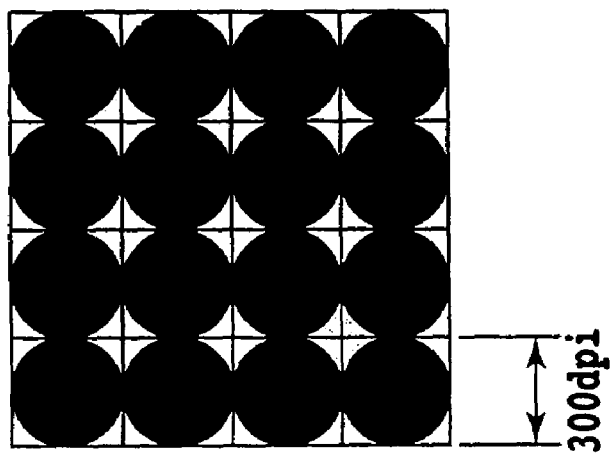
FIGS. 16A, 16B, and 16C are diagrams illustrating another conventional example in which an image of print duty 25% is thinned.
Figure 16B:
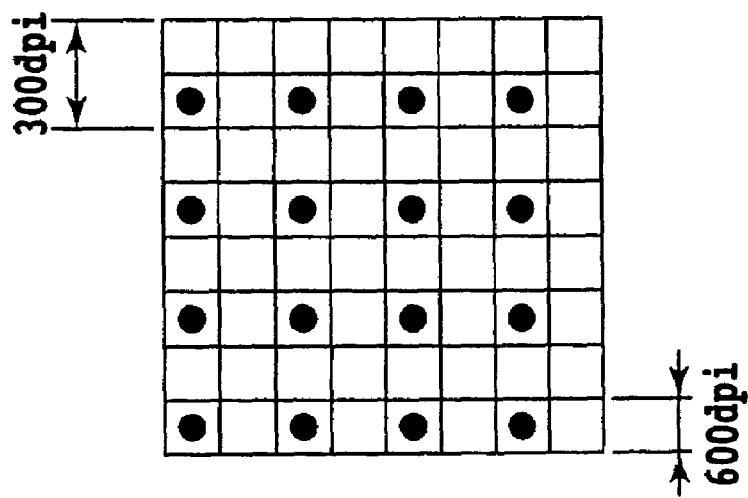
Figure 16A:
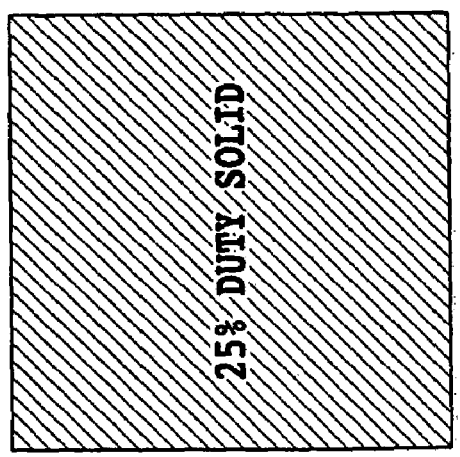

The output gamma correction value B2 in FIG. 12 allows a 100%-print-duty solid image of the black ink such as the one shown in FIG. 11A to be printed so that the print dots are thinned as shown in FIG. 14A. In this case, as shown in FIG. 13A or 13B, one dot or zero dot (no dot) of the black ink is printed in the primitive lattice. On the other hand, a 100%-print-duty solid image of the color ink such as the one shown in FIG. 11B is printed so that the print dots are thinned by 50% as shown in FIG. 14B.

The present embodiment comprises two thinning means for executing the thinning process using the output gamma correction and the thinning process using the index pattern. Black ink dots are subjected to the thinned printing using the former thinning means. Color ink dots are subjected to the thinned printing using the latter thinning means. As a result, it is possible to execute the thinned printing on print dots of the black ink, for which only one dot is printed in one print pixel (primitive lattice). Further, print dots of the color inks can be subjected to the thinned printing that minimizes the degradation of colored images.

Other Embodiments

As a system for thinning color ink dots, the first embodiment employs the dot thinning system for reducing the number of dots in the primitive lattice, whereas the second embodiment employs the thinning system for using the index pattern. The thinning rate according to the former thinning system is a multiple of reciprocal of the number of dots per primitive lattice. In the first embodiment, the thinning rate is a multiple of 50% (=½). The thinning rate according to the latter thinning system is a multiple of reciprocal of the size of the index pattern with respect to the size of a primitive lattice in an input image. In the second embodiment, the thinning rate is a multiple of 25% (=¼). On the other hand, for the black ink dots, the thinning based on the output gamma correction allows the density to be freely changed. To allow the easier identification of texts (letters) printed using the black ink, the print duty for the black ink is desirably comparable to or higher than that for the color inks. In other words, the thinning rate for the color ink dots is desirably comparable to or higher than that for the black ink dots. In the first embodiment, the thinning rates for black and color ink dots are both 50%. In the second embodiment, the thinning rate for black ink dots is 40%, whereas the thinning rate for color ink dots is 50%.

The relationship between the thinning rate for black ink dots and the thinning rate for color ink dots is not limited to the above one but may be arbitrarily set. The relationship may be arbitrarily set in accordance with, for example, differences in characteristics between the black ink and the color inks or the type of the print image (text, color image, or the like).

In the above described embodiments, one dot of the black ink is printed in the print lattice of 600 dpi. In this case, it is difficult to regulate the print duty using the system for thinning color ink dots according to the above first and second embodiments, so as to allow the easier identification of texts (letters) printed using the black ink. The present invention is also effective on printing of a plurality of black ink dots in one input pixel (corresponding to a primitive lattice at the print resolution of input image data). In this case, beside the above thinning based on the output gamma correction, the system for thinning color ink dots according to the above first and second embodiments can be used. In short, the dot thinning system may be varied depending on the characteristics of the black and color inks or the like.

The present invention is also applicable to a system composed of a plurality of machines (for example, a host computer, an interface machine, a reader, and a printer) or an apparatus composed of a single machine (for example, a copier or a facsimile machine).

The object of the present invention may also be accomplished by supplying a system or an apparatus with a storage medium (or recording medium) in which program codes for software implementing the functions of the previously described embodiments are recorded and allowing a computer (or CPU or MPU) in the system or apparatus to read and execute the program codes stored in the storage medium. In this case, the program codes read from the storage medium implement the functions of the previously described embodiments. The program codes themselves and the storage medium storing them constitute the present invention.

The functions of the previously described embodiments are executed not only by executing the program codes read by the computer but also by allowing an operating system (OS) or the like running on the computer to execute a part or the whole of the actual process on the basis of instructions from the program codes.

Moreover, according to the present invention, the functions of the previously described embodiments are executed by writing the program codes read from the storage medium, in a memory provided in an expanded card inserted into the computer or an expanded unit connected to the computer and allowing a CPU or the like provided in the expanded card or unit to execute a part or the whole of the actual process.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

This application claims priority from Japanese Patent Application No. 2003-284384 filed Jul. 31, 2003, which is hereby incorporated by reference herein.

What is claimed is:

1. A printing apparatus that can print an image by using a black ink and a color ink other than the black ink to form dots of the black ink and color ink on a printing medium on the basis of print data, the apparatus comprising:
   black printing control means for reducing the number of dots formed by the black ink by correcting multivalued data of the print data in order to lower the density of a final print image; and
   color printing control means for reducing the number of dots formed by the color ink by correcting binary data of the print data in order to lower the density of the final print image.

2. A printing apparatus as claimed in claim 1, wherein said black printing control means thins dots using output gamma correction that coffects said print data so as to reduce a print density of the image.

3. A printing apparatus as claimed in claim 1, wherein said color printing control means processes said print data for a print pixel in which a plurality of dots are formed per print pixel so as to reduce the number of dots formed per print pixel.

4. A printing apparatus as claimed in claim 1 wherein said color printing control means carries out printing in accordance with a dot pattern in which arrangement of dots formed per print pixel is defined, and, if a plurality of dots are formed per print pixel, forms dots in accordance with a dot pattern that reduces the number of dots formed per print pixel.

5. A printing apparatus as claimed in claim 1, wherein said black printing control means and said color printing control means have different dot thinning rates.

6. A printing apparatus as claimed in claim 5, wherein said black printing control means has a lower dot thinning rate than said color printing control means.

7. A printing method that can print an image by using a black ink and color ink other than the black ink to form dots of the black ink and color ink on a printing medium on the basis of print data, the method comprising:
   a black printing control step of reducing the number of dots formed by the black ink by correcting multivalued data of the print data in order to lower the density of a final print image; and
   a color printing control step of reducing the number of dots formed by the color ink by correcting binary data of the print data in order to lower the density of the final print image.

* * * * *

UNITED STATES PATENT AND TRADEMARK OFFICE
CERTIFICATE OF CORRECTION

| | |
|---|---|
| PATENT NO. | : 7,264,325 B2 |
| APPLICATION NO. | : 11/500884 |
| DATED | : September 4, 2007 |
| INVENTOR(S) | : Kawatoko et al. |

It is certified that error appears in the above-identified patent and that said Letters Patent is hereby corrected as shown below:

COVER PAGE, item [57]:
ABSTRACT,
Line 3, "is" should read -- are --,
Line 6, "dot" should read -- dots --; and
Line 7, "is" should read -- are --.

COLUMN 2:
Line 59, "solution" should read -- resolution --.

COLUMN 3:
Line 30, "thinning" should read -- thin --.

COLUMN 5:
Line 31, "back" should read -- black --; and
Line 43, "back" should read -- black --.

COLUMN 6:
Line 4, "apparatus" should read -- apparatus --.

COLUMN 7:
Line 40, "above described" should read -- above-described --.

COLUMN 8:
Line 64, "above described" should read -- above-described --.

UNITED STATES PATENT AND TRADEMARK OFFICE
CERTIFICATE OF CORRECTION

PATENT NO. : 7,264,325 B2
APPLICATION NO. : 11/500884
DATED : September 4, 2007
INVENTOR(S) : Kawatoko et al.

It is certified that error appears in the above-identified patent and that said Letters Patent is hereby corrected as shown below:

COLUMN 10:
Line 16, "above described" should read -- above-described --.

COLUMN 11:
Line 22, "coffects" should read -- corrects --.

COLUMN 12:
Line 1, "claim 1" should read -- claim 1, --.

Signed and Sealed this

Twentieth Day of May, 2008

JON W. DUDAS
*Director of the United States Patent and Trademark Office*